Aug. 7, 1962    A. L. HUBBARD    3,047,996
COTTON HARVESTER
Filed Sept. 9, 1960
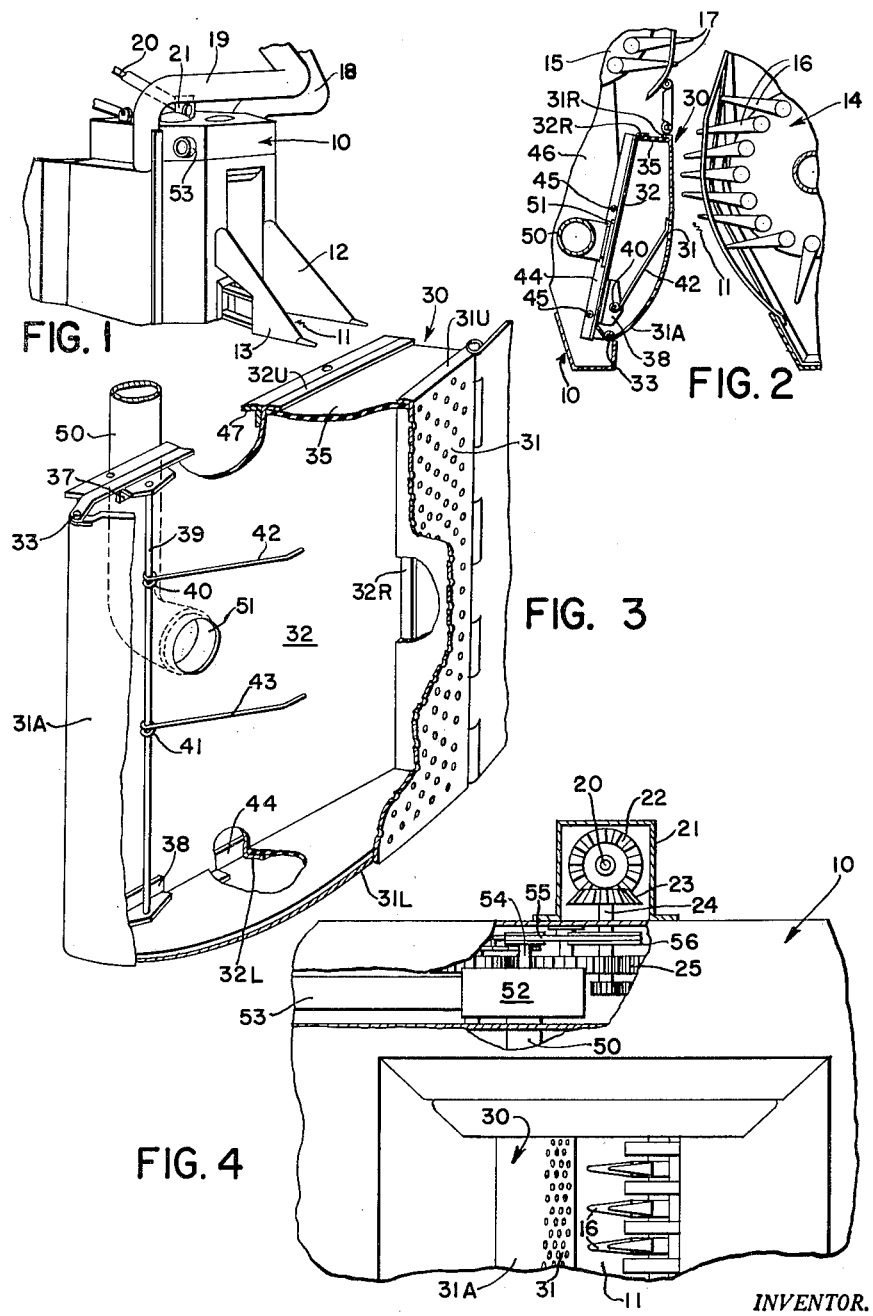
INVENTOR.
A.L. HUBBARD
BY William A. Murray
ATTORNEY United States Patent Office 3,047,996
Patented Aug. 7, 1962

3,047,996
COTTON HARVESTER
Arthur L. Hubbard, Des Moines, Iowa, assignor to Deere & Company, Moline, Ill., a corporation of Delaware
Filed Sept. 9, 1960, Ser. No. 54,894
8 Claims. (Cl. 56—41)

This invention relates to a cotton harvester and more particularly to an improvement for a cotton harvester.

In the conventional type cotton harvester there is provided a main housing having a fore and aft extending plant passage which receives a row of cotton plants as the harvester moves forwardly. Contained within the housing is a picking drum having laterally extending picker spindles which operate to move into the plant passage and to pick the cotton from the plants. Normally there is a considerable amount of debris or other foreign matter which is collected with the cotton and which moves into the picker housing. Means are provided within the picker housing to remove the cotton from the spindles and to transfer the cotton into a conveying system which moves it to a receptacle. While means are provided to eliminate much of the trash from the cotton, nevertheless a degree of trash does move through the housing and into the receptacle.

It is the purpose of the present invention to incorporate in a conventional type cotton picker additional means for removing trash from the cotton. In the conventional type cotton harvester there is on the opposite side of the plant passage than the spindles an upright pressure plate which is biasly mounted to apply a slight degree of pressure on the plant so that the spindles may more actively contact the cotton on the plant. In the preferred form of the invention it is proposed to provide perforations in the pressure plate and to provide a means of applying suction to the back side of the plate which in effect will create a flow of air through the cotton as the spindles operate to remove the cotton. Consequently, minute trash will be drawn from the cotton and will be impinged against the face of the perforated pressure plate. Due to the action of the cotton plants moving through the plant passage, the trash will constantly be swept off of the face of the plate and will tend to gravitate onto the ground. Consequently, the cotton being moved into the picker housing will be considerably cleaner than heretofore.

It is also the object of the present invention to incorporate in the cotton harvester a suction fan which is driven from the main drive source of the harvester and which has a suction duct opening to the back side of the aforementioned pressure plate. The pressure plate will be further expanded into a structure which includes a second plate spacedly from the pressure plate itself and which has the edges of the two plates interconnected by means of a rubber mat or rubber-impregnated fabric which will permit the two plates to move together. The back or second plate will be fixed to the harvester frame and the pressure plate will be pivotally mounted on the picker frame so that it may yield away from the plant passage to thereby permit large objects to pass through the plant passage without injuring the spindles. This latter feature is, however, conventional and it is here mentioned only for the purpose of indicating that the present invention will in no manner hinder or otherwise deviate from one of the main purposes of a conventional type pressure plate. The suction duct will open into the area between the back plate and the pressure plate and since the area is sealed off by the rubber-impregnated fabric, the entire structure will operate as a yieldable suction bag which causes air to pass through the perforations in the pressure plate.

Other objects and advantages of the present invention will become apparent to those skilled in the art as the nature of the invention is better understood from the following description and as shown in the accompanying drawings.

FIG. 1 is a front and side perspective view of a portion of a cotton harvester incorporating the principles of the present invention.

FIG. 2 is a plan view with parts broken away and shown in section of the forward portion of the cotton harvester showing the picker drum as well as the pressure plate structure.

FIG. 3 is an enlarged perspective view with parts broken away and shown in section of the pressure plate structure.

FIG. 4 is an enlarged front view of the upper portion of the harvester with portions of the housing broken away to show internal drive mechanism.

The cotton harvester herein to be described is generally of the type shown and described in U.S. Patent 2,904,948 issued September 22, 1959 to the present inventor. The harvester includes a main housing 10, having a centrally located fore and aft extending plant passage 11. The housing 10 also has a pair of forwardly extending gathering points 12, 13 disposed on opposite sides of the plant passage 11, which operate to gather and to feed the plants into the housing 10 as the harvester advances. As is conventional, there is provided in the housing 10 a pair of upright picking drums 14, 15, shown only partially in FIG. 2, which have laterally extending picking spindles 16, 17 respectively which extend into the plant passage 11 and generally pick the cotton from the plants as they move through the plant passage 11. The drums 14, 15 rotate so as to draw the spindles 16, 17 within the housing structure where they move in contact with doffing structure, not shown, which removes the cotton from the spindles 16, 17. The doffed cotton is moved through suction type conveyor ducts 18, 19 to a cotton receptacle, also not shown, carried on the main frame of the harvester. Suitable drive means is provided for operating the mechanism within the harvester and includes a main drive shaft 20 which extends into a transmission housing 21 carried on the harvester housing 10. A gear transmission in the form of bevel gears 22, 23 is contained within the transmission housing 21 and operates to drive a vertical shaft 24 projecting downwardly into the top of the housing 10 to suitable gearing 25. The gearing 25 is arranged to operate the picking drums 14, 15, and the other mechanism within the housing 10. Up to this point, the harvester is of conventional nature and consequently has been described in only general terms. However, if more detailed study of the harvester is desired, such may be had by referring to the aforementioned U.S. Patent 2,904,948.

On the opposite side of the plant passage 11 then the picking drum 14, is a pressure plate structure, here indicated in its entirety by the reference numeral 30. The pressure plate structure 30 includes a perforated arcuate shaped plate 31 which is disposed upright and lies adjacent to and defines one side of the plant passage 11. A second imperforate upright plate 32 is positioned outwardly relative to the plant passage 11. The forward imperforate portion 31A of the plate 31 curves outwardly and is pivotally connected to the forward edge of the second plate 32 by means of a pivot rod 33 so that the plate 31 may move toward or away from the second plate 32. Outwardly extending flanges 31U and 31L are provided at the upper and lower edges of the perforated plate 31. Similarly at the rear edge of the perforated plate 31 an outwardly extending flange 31R is provided. The plate 32 has inwardly extending upper and lower flanges 32U, 32L respectively and a rear inwardly extending flange 32R. Extending between the flanges 31U, 32U; 31R, 32R; and 31L, 32L is a one piece continuous rubber flexible mat 35. The mat 35 is here shown as being composed of rubber, but generally it should be recognized that any type of impervious material such as a treated fabric which is both impervious and flexible, would operate in a similar manner. Also, it should be recognized that in the purpose that the rubber or flexible mat 35 is being used, other systems could be devised to obtain substantially the same result, i.e. a flexible or yieldable compartment sealed on all sides except the inner side or panel 31. The mat 35 may be fixed to the respective flanges by suitable means such as bonding, the exact method not being important for the purpose of the present invention. The mat 35 and the plates 31, 32 therefore define an upright chamber formed at its opposite sides and at its front by the pressure panels or plates 31, 32 and at its top, bottom, and rear by the rubber mat 35.

Welded to the internal surface of the panel 32 are a pair of aligned vertically spaced brackets 37, 38. The brackets 37, 38 support laterally extending flanges which in turn have rigidly connected thereto a vertical rod 39. Carried on the rod 39 are a pair of vertically spaced apart torsion springs 40, 41 having radially extending leg portions 42, 43 which engage the back side of the panel 31. The purpose of the springs 40, 41 is to resist movement of the panel or plate 31 away from the plant passage 11. However, should a large foreign object move into the plant passage 11, the plate 31 would yield sufficiently away from the passage to permit the foreign object to pass without injury to the spindles 16. Also, should a relatively large plant move through the passage, the plate 31 will yield but will also apply a gentle pressure to the plant so that the spindle 16 may contact the cotton bolls on the plant. Also, it should be recognized that the rubber mat 35 will permit movement between the plates 31, 32 and that at any position the mat will retain a sealed relation with the flanges on the respective plates. On the lower edge of the plate 32 there is welded an angle iron 44. Suitable bolts, as at 45, fix the angle iron 44 to a framework, such as shown at 46 (FIG. 2) in the lower portion of the main housing 10. A similar angle iron 47 is provided on the upper edge of the plate 32 and may be connected to upper framework, not shown, within the picker housing 10.

A suction opening is provided in the back plate 32 and has inserted therein the lower end of a suction duct 50, a suitable fitting 51 being provided to prevent leakage of air at the joint of the suction duct 50 and the plate 32. As may be seen from viewing FIG. 3, the suction duct 50 has an elbow at its lower end so that at its entrance the suction duct is normal to the plane of the plate 32. The upper end of the suction duct 50 extends into a central air intake opening of a conventional type blower, here indicated in its entirety by the reference numeral 52, which has a blower discharge duct 53 extending across the front of the picker housing 10 and discharging out an outer panel of the housing. The blower 52 may be of any conventional design and its exact design is generally not of particular importance relative to the invention. The blower 52 is, however, of the rotor type having a vertical rotor shaft 54 driven by means of a belt drive 55, the latter drive having a main drive pulley 56 fixed to the vertical shaft 24.

The pressure plate structure operates in the following manner. The blower 52 will operate in unison with the harvesting mechanism. Consequently the blower 52 will create a constant vacuum within the chamber formed by the walls 31, 32 and the rubber mat 35. Due to the vacuum, air will continuously flow through the passageway 11, and through the perforated wall 31. It should be noted that the forward portion 31A of the wall 31 is not perforated, as is the portion adjacent to the spindles 16 on the drum 14. As the spindles 16 dislodge the cotton bolls from the plants, there will be minute trash such as leaves and small particles attached to the cotton. The draft of air passing through the perforated wall 31 will create a suction area adjacent to the cotton bolls which will draw the minute trash away from the bolls to impinge against the plate 31. However, as the plants pass through the plant passage, they will tend to brush off the plate 31 thereby maintaining the face of the plate 31 relatively clean. As previously mentioned, should a larger foreign object or a very large plant pass through the plant passage 11, the mounting arrangement of the plate 31 is such that it may yield away from the passage 11. However, the biasing force of the springs 40, 41 will tend to move the plate 31 to its original position. Any minute trash which may pass through the wall 31 will move through the blower 52 and out the discharge duct 53.

While only one form of the invention has been shown, it should be recognized that other forms and variations will occur to those skilled in the art. Therefore, it should be understood that the present disclosure was made in concise and detailed nature for the purpose of clearly and concisely illustrating the principles of the invention and was not intended to limit or narrow the invention beyond the broad concept set forth in the appended claims.

What is claimed is:

1. In a cotton harvester having housing structure defining a fore and aft extending plant passage which successively receives cotton plants as the harvester advances, and a cotton harvesting mechanism supported by the housing structure on one side of the passage and having a plurality of vertically spaced and laterally extending harvesting spindles which extend into the passage and pick the cotton bolls from the plants, the improvement comprising: structure defining an upright chamber on the opposite side of the passage than the harvesting mechanism and including an upright wall opposite to and facing the spindles, the wall being pervious to pass air through it; structure on the cotton harvester effecting a vacuum in the chamber and to effect a draft of air through the wall whereby trash loosely attached to the plants and cotton will be drawn to the wall to impinge against the wall as the spindles harvest the cotton from the plants.

2. In a cotton harvester having housing structure defining a fore and aft extending plant passage which successively receives cotton plants as the harvester advances, and a cotton harvesting mechanism supported by the housing structure on one side of the passage and having a plurality of vertically spaced and laterally extending harvesting spindles which extend into the passage and pick the cotton bolls from the plants, the improvement comprising: wall structure on the opposite side of the passage facing the spindles, the wall being pervious to pass air through it; structure on the cotton harvester effecting a vacuum behind the wall whereby trash loosely attached to the plants and cotton will be drawn to and impinge against the wall as the spindles harvest the cotton from the plants.

3. In a cotton harvester having housing structure defining a fore and aft extending plant passage which successively receives cotton plants as the harvester advances, and a cotton harvesting mechanism supported by the housing structure on one side of the passage and having a plurality of vertically spaced and laterally extending harvesting spindles which extend into the passage and pick the cotton bolls from the plants, the improvement comprising: perforated wall structure facing the spindles; structure on the cotton harvester effecting a vacuum behind the wall structure whereby trash loosely attached to the cotton will be drawn to and impinge against the wall structure.

4. In a cotton harvester having housing structure defining a fore and aft extending plant passage which successively receives cotton plants as the harvester advances, and a cotton harvesting mechanism supported by the housing structure on one side of the passage and having a plurality of vertically spaced and laterally extending harvesting spindles which extend into the passage and pick the cotton bolls from the plants; the improvement comprising: an upright wall on the opposite side of the passage facing the spindles, the wall being pervious to pass air through it; structure on the cotton harvester effecting a vacuum behind the wall whereby trash loosely attached to the plants and cotton will be drawn to and impinge against the wall; means pivotally mounting the wall on the housing structure to yield toward or away from the plant; and biasing means engaging the wall for resisting movement of the wall away from the passage.

5. The invention defined in claim 4 further characterized by the structure on the cotton harvester effecting a vacuum is in the form of a second wall spaced from aforesaid wall and connected to the latter by extensible and retractable sides which define with the walls a vacuum chamber; and a vacuum pump with an inlet to said chamber for effecting a vacuum in the chamber.

6. In a cotton harvester having housing structure defining a fore and aft extending plant passage which successively receives cotton plants as the harvester advances, and a cotton harvesting mechanism supported by the housing structure on one side of the passage and having a plurality of vertically spaced and laterally extending harvesting spindles which extend into the passage and pick the cotton bolls from the plants, the improvement comprising: an upright wall supported on the housing structure on the opposite side of the passage and facing the spindles; structure on the cotton harvester effecting a draft of air through the passage and in a direction whereby trash loosely attached to the plants and cotton will move toward and impinge against the wall.

7. A pressure plate structure for a cotton harvester comprising: a perforated plate having peripheral edges; a second plate spaced from the perforated plate and having peripheral edges; yieldable impervious means connecting the edges of the plates to permit movement of the plates toward or away from one another and defining with said plates an upright chamber closed at its upper and lower ends; and suction means connected to and effecting vacuum pressure in the chamber to cause air to pass through the perforated plate.

8. A pressure plate structure for a cotton harvester comprising: a perforated plate; means behind the plate and defining with the plate an upright chamber; and blower means connected to and effecting pressure differential in the chamber to cause air to pass through the perforated plate.

References Cited in the file of this patent
UNITED STATES PATENTS

| | | |
|---|---|---|
| 767,058 | Harvin | Aug. 9, 1904 |
| 1,107,908 | Cunningham | Aug. 18, 1914 |
| 1,139,492 | Creekmore | May 18, 1915 |
| 2,904,948 | Hubbard | Sept. 22, 1959 |